(12) United States Patent
Edens

(10) Patent No.: US 8,376,437 B2
(45) Date of Patent: Feb. 19, 2013

(54) TRUCK BED CAP

(76) Inventor: David Edens, Tallahassee, FL (US)

( * ) Notice: Subject to any disclaimer, the term of this patent is extended or adjusted under 35 U.S.C. 154(b) by 262 days.

(21) Appl. No.: 12/925,555

(22) Filed: Oct. 25, 2010

(65) Prior Publication Data

US 2011/0095559 A1   Apr. 28, 2011

Related U.S. Application Data

(60) Provisional application No. 61/255,432, filed on Oct. 27, 2009.

(51) Int. Cl.
*B60P 3/34* (2006.01)
(52) U.S. Cl. .............. 296/26.05; 296/24.45; 296/100.05
(58) Field of Classification Search .................. 296/165, 296/173, 26.04, 26.05, 26.06, 26.07, 100.03, 296/100.04, 100.05, 100.06, 100.07, 100.08, 296/100.1, 24.44, 24.45
See application file for complete search history.

(56) References Cited

U.S. PATENT DOCUMENTS

| | | | | |
|---|---|---|---|---|
| 4,762,360 | A * | 8/1988 | Huber | 296/100.07 |
| 6,467,830 | B1 * | 10/2002 | Cortright | 296/37.6 |
| 8,007,024 | B2 * | 8/2011 | Kealy | 296/100.02 |
| 2005/0194807 | A1 * | 9/2005 | Gonzalez | 296/26.05 |
| 2008/0174142 | A1 * | 7/2008 | Pearlman | 296/100.1 |
| 2008/0191512 | A1 * | 8/2008 | Kealy | 296/100.05 |

* cited by examiner

*Primary Examiner* — Jason S Morrow
(74) *Attorney, Agent, or Firm* — J. Wiley Horton; Adrienne C Love

(57) ABSTRACT

The present truck bed cap consists of an internal frame having a first shelf, a second shelf and a top, wherein the internal frame is connected to corner supports attached to the bed of the truck. In a first motion the top shifts vertically with respect to the internal frame. In a second motion the internal frame shifts vertically with respect to the corner supports and the bed of the truck.

14 Claims, 18 Drawing Sheets

TRUCK BED CAP

CROSS-REFERENCES TO RELATED APPLICATIONS

This application is a non-provisional application claiming the benefit, pursuant to 37 C.F.R. §1.53(c), of an earlier-filed provisional application. The provisional application was filed on Oct. 27, 2009 and was assigned application Ser. No. 61/255,432.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of truck covers. More specifically, the invention comprises a truck bed cap having a storage system that shifts vertically with respect to the bed of a pickup truck.

2. Description of the Related Art

Pick-up trucks are often used for transporting tools, luggage, hardware and other materials in the bed of the truck. Typically, in order to protect and semi-permanently store the items being transported a camper shell, also known as a truck bed cap, is utilized. The truck bed cap generally covers the entirety of the pickup truck bed and is as tall as the top of the truck cabin.

A prior art truck bed cap 12 is shown in FIG. 1. Prior art truck bed cap 12 forms a seal around truck bed 10. In order to access the stored items prior art truck bed caps 12 have been equipped with shelves 16 and side and back doors 14, 22, as shown in FIG. 2. When side door 14 is opened the user can access stored items 18. However, only those items stored on shelves 16 can be accessed via side door 14. Any item stored underneath shelves 16 must be accessed by way of hinged rear tailgate 24. While longer items may reach the forward facing portion of the truck bed, it is unlikely that the space near the front of the bed will be fully utilized due to the inaccessible nature of this area under the present design.

Therefore what is needed is a truck bed cap which can efficiently utilize the space in the forward facing portion of the truck bed and simplify access to all stored items. The present invention achieves this objective, as well as others that are explained in the following description.

BRIEF SUMMARY OF THE PRESENT INVENTION

The present invention is a truck bed cap for easily accessing items in the bed of a truck. The present truck bed cap generally consists of a first shelf and a second shelf attached to an internal frame, wherein the internal frame is engaged with four corner supports. A top is connected to the internal frame. The top shifts vertically with respect to the internal frame and the shelves shift vertically with respect to the four corner supports and the bed of the truck. When in a closed position, the top of the truck bed cap meets the top of truck bed such that it forms a seal around truck bed.

REFERENCE NUMERALS IN THE DRAWINGS

| 10 | truck bed | 12 | prior art truck bed cap |
|---|---|---|---|
| 14 | door | 16 | shelves |
| 18 | stored items | 20 | truck |
| 22 | bed cover back door | 24 | hinged rear tailgate |
| 26 | truck bed cap | 28 | top |
| 30 | internal frame | 32 | first shelf |
| 34 | second shelf | 36 | arm assembly |
| 38 | bearings | 40 | pivot pin |
| 42 | drive shaft | 44 | gear motor |
| 46 | gear box | 48 | lifting post |
| 50 | screw | 52 | truck bed |
| 54 | lock | 56 | tail gate |
| 58 | corner support | 60 | electric screw jack |
| 62 | winch | 64 | large item |
| 66 | cable | 68 | bar |
| 70 | groove | 72 | storage unit |
| 74 | winch cable | 76 | safety line |

-continued

| 78 | top gear motor | 80 | nut |
| 82 | input | 84 | extension |
| 86 | input drive shaft | 88 | lip |

DETAILED DESCRIPTION OF THE INVENTION

Figure 1:
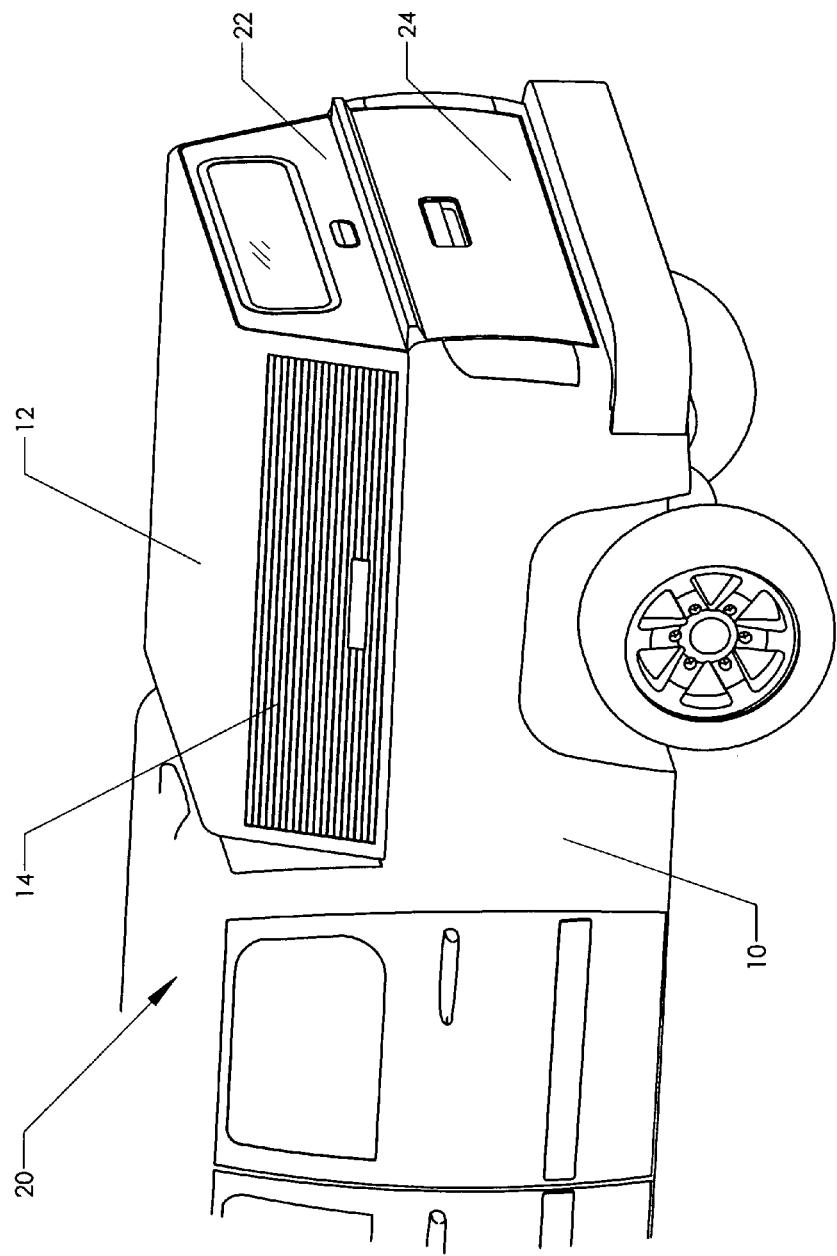
FIG. 1 is a perspective view, showing a prior art truck bed cap.
Figure 2:
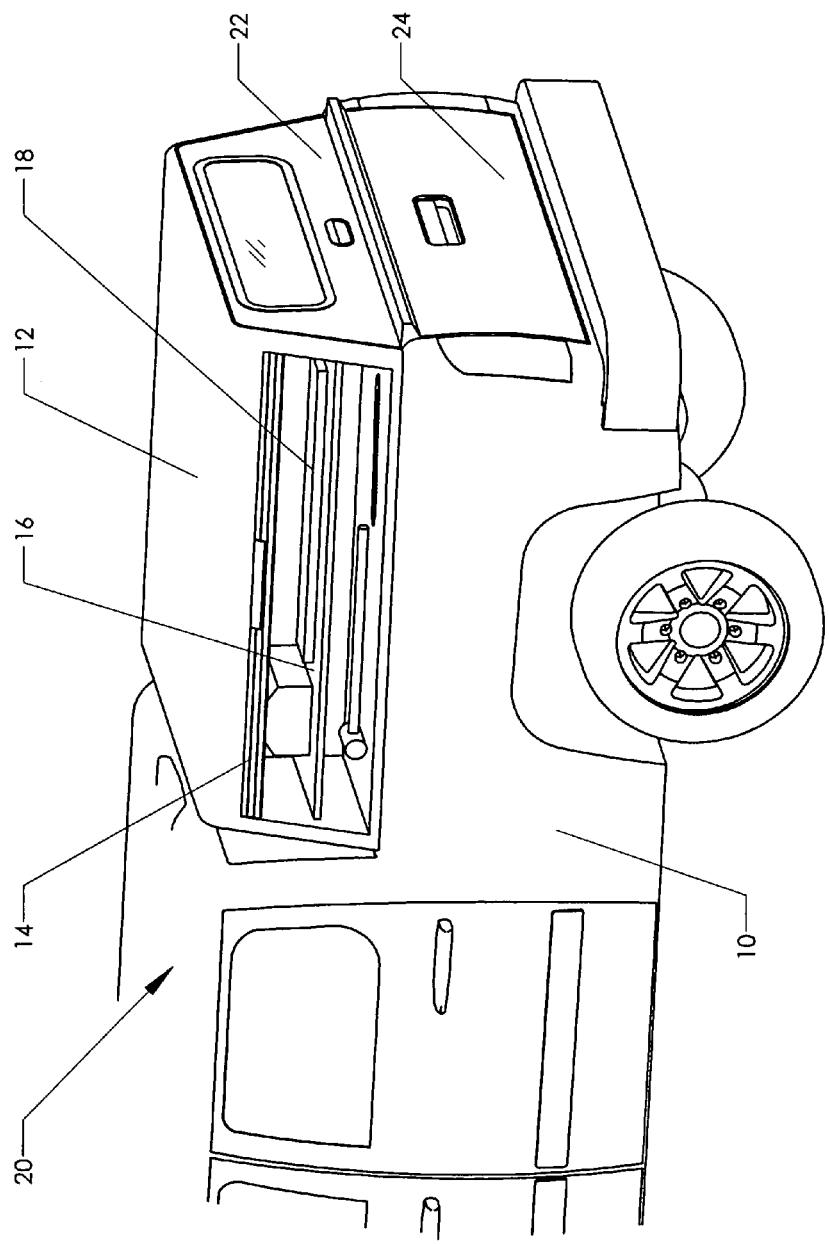
FIG. 2 is a perspective view, showing a prior art truck bed cap opened at a side door.
Figure 3:
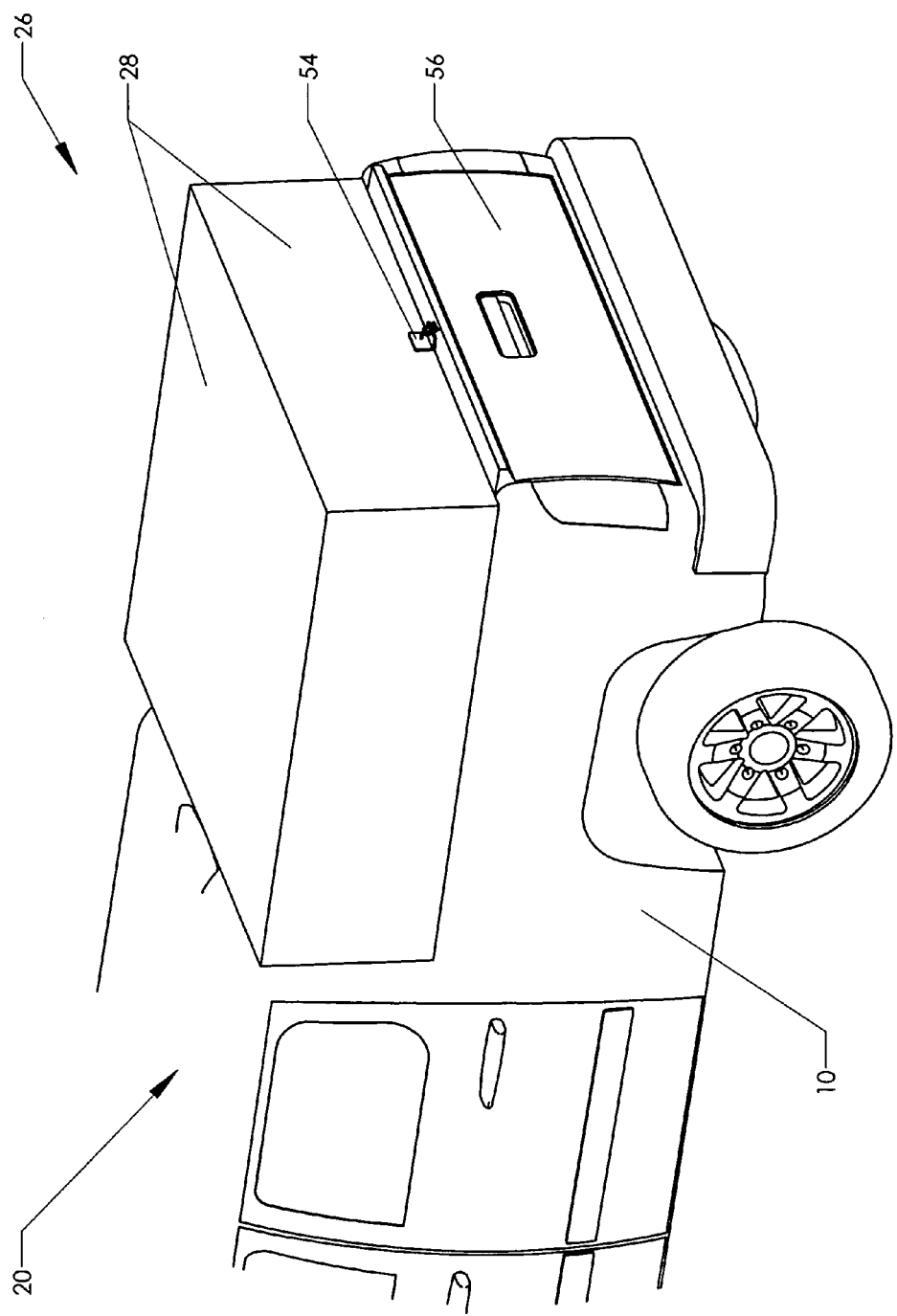
FIG. 3 is a perspective view, showing the preferred embodiment of the present invention in a closed position.

FIG. 3 illustrates truck bed cap 26 installed in a closed position on truck 20. In the closed position, the user can easily transport or store any items in truck bed cap 26. Top 28 of truck bed cap 26 fully encloses and forms a seal around truck bed 10. Top 28 does not contain any doors or windows in the preferred embodiment, however, the reader will appreciate that the addition of doors or windows would not materially change the nature of truck bed cap 26. Top 28 of truck bed cap 26 is preferably made from a lightweight material, such as aluminum or molded plastic, however one skilled in the art will recognize that top 28 could be made of many different materials to create a weather resistant seal around truck bed 10.

Additionally, top 28 of truck bed cap 26 preferably contains a lock 54 which extends over tail gate 56, to prevent unwanted access to contents stored inside of truck bed cap 26. Any conventional locking system could be utilized.

Figure 4:
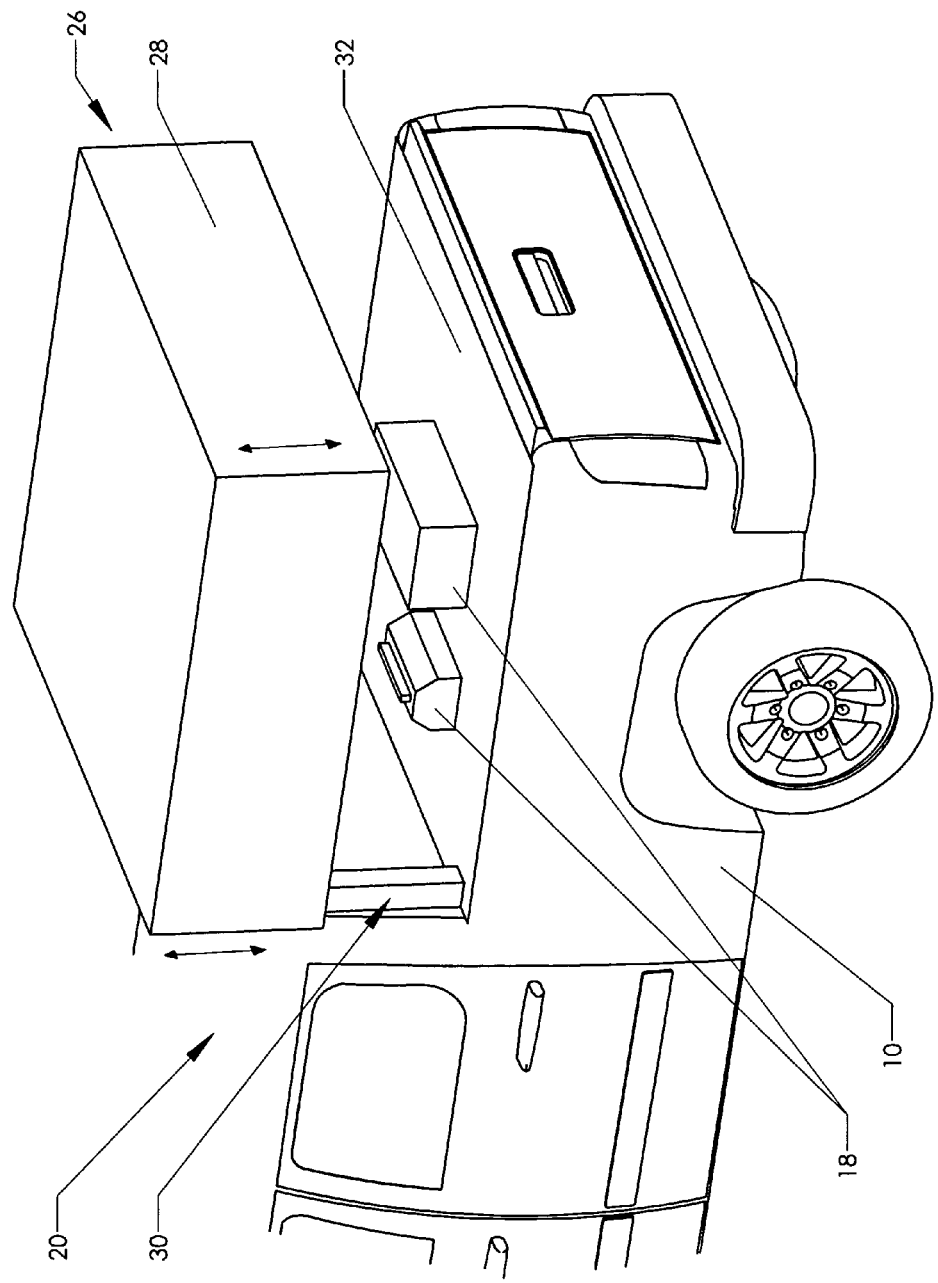
FIG. 4 is a perspective view, showing the preferred embodiment of the present invention in a partially open position.
Figure 14:
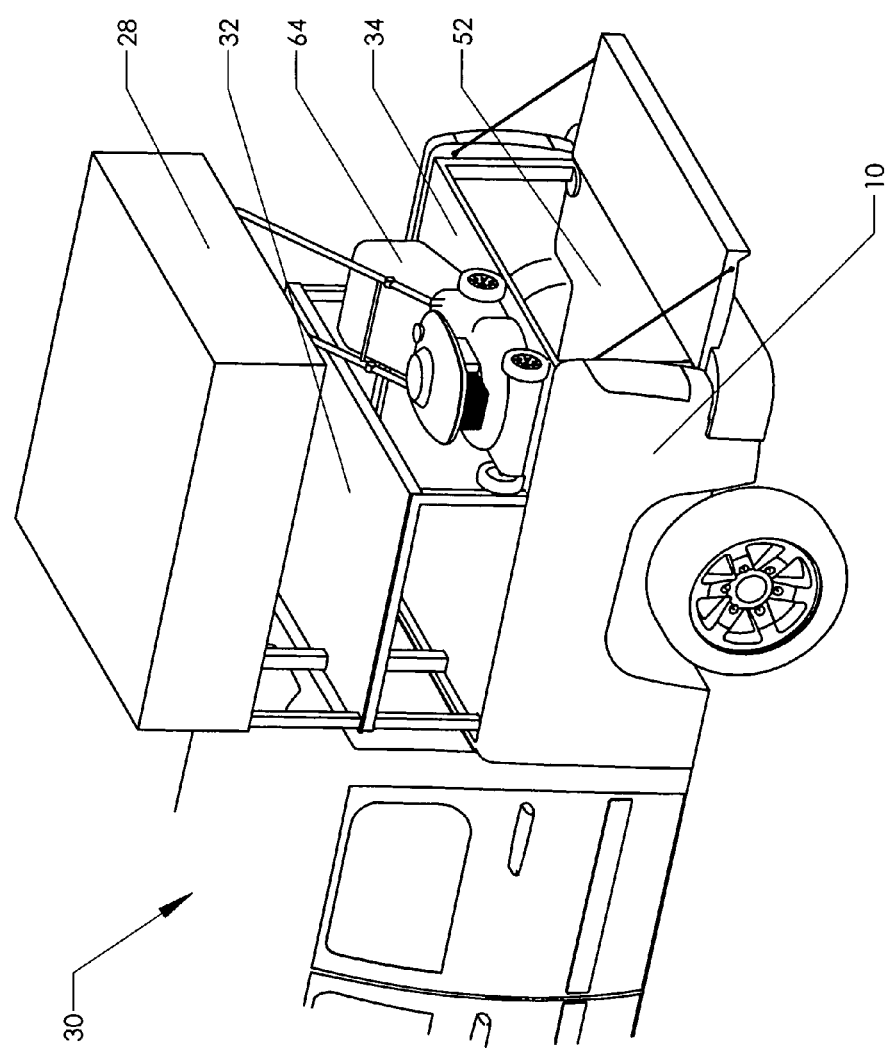
FIG. 14 is a perspective view, showing an alternate embodiment of the present invention with a shortened first shelf.

When the user desires to access stored items 18, a remote switch is utilized to begin to shift top 28 vertically with respect to internal frame 30 of truck bed cap 26 as illustrated in FIG. 4 (arrows show the direction of movement of top 28). Once top 28 is lifted exposing first shelf 32, stored items 18 located on first shelf 32 can be easily accessed. The user can reach to the center of first shelf 32 while standing along the side of truck bed 10 or from the back of truck bed 10. Three of the four sides of first shelf 32 are fully unobstructed. As illustrated first shelf 32 extends the full length of truck bed 10 in the preferred embodiment. While this embodiment is preferable, first shelf 32, in the alternative, can extend less than the full length of truck bed 52. This alternative embodiment creates a larger vertical space near the rear of truck bed 10 where large items 64, such as lawnmowers can be stored (as illustrated in FIG. 14). This embodiment does not alter the function of the present truck bed cap 26.

Figure 5:
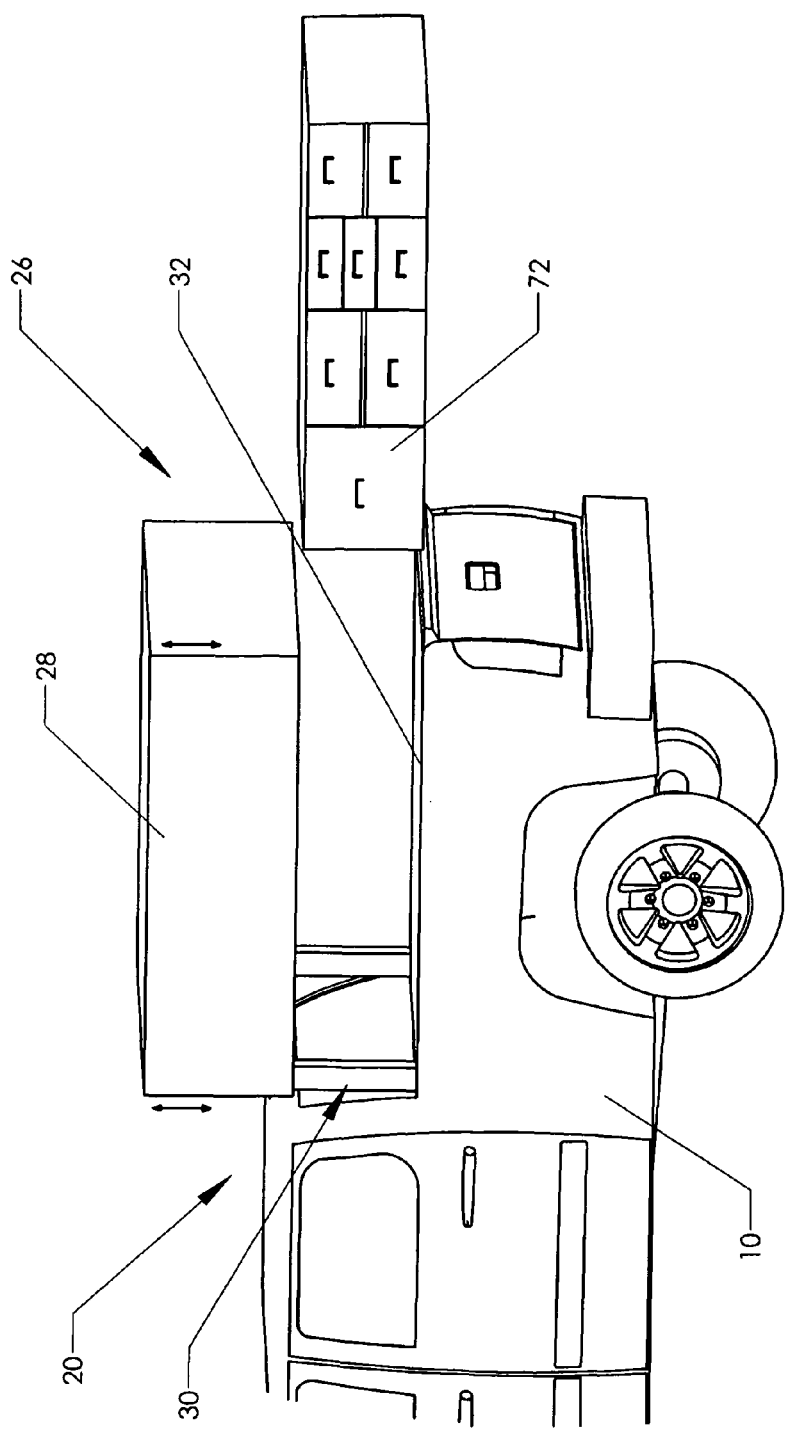
FIG. 5 is a perspective view, showing the preferred embodiment in a partially open position with storage unit uninstalled.
Figure 6:
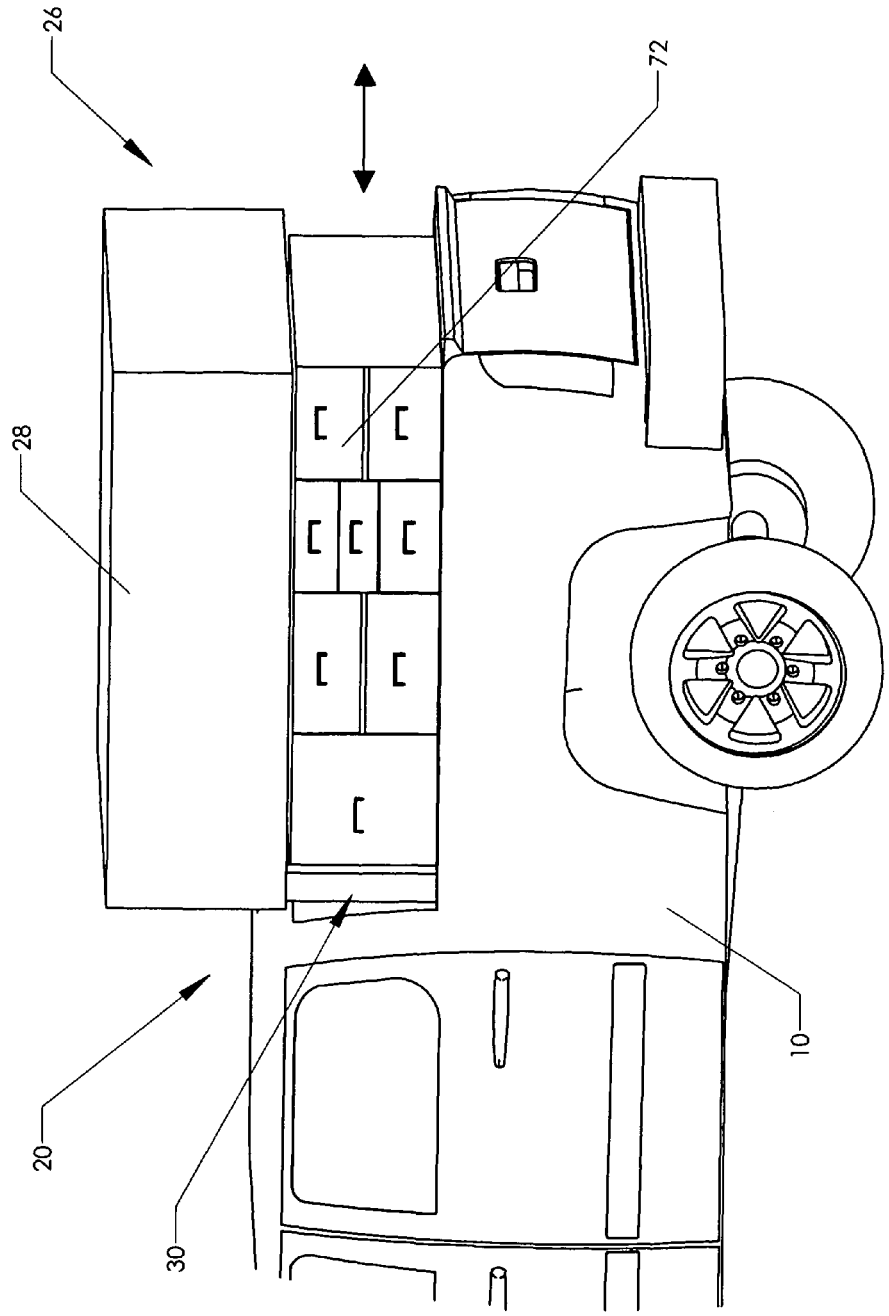
FIG. 6 is a perspective view, showing the preferred embodiment in a partially open position with storage unit installed.

Additionally, first shelf 32 can contain a storage unit 72. FIG. 5 shows a storage unit 72 which is removable. Storage unit 72 can be temporarily attached by any known means. FIG. 6 shows storage unit 72 after being installed on first shelf 32. In the alternative, storage unit 72 could be permanently integrated with first shelf 32.

Figure 7:
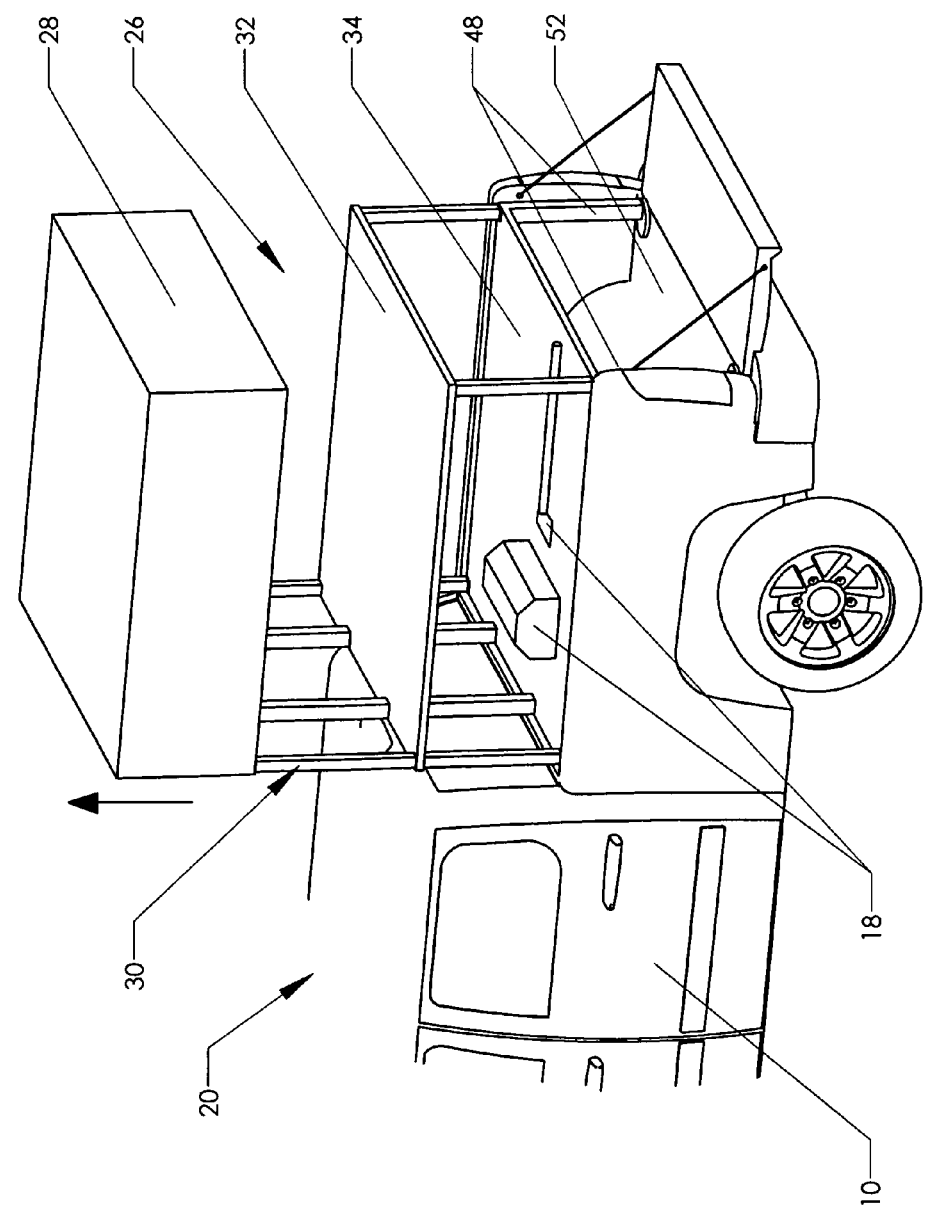
FIG. 7 is a perspective view, showing the preferred embodiment of the present invention in a fully open and raised position.

If the user desires to access stored items 18 underneath first shelf 32, the user again uses a remote switch to begin to shift internal frame 30 vertically with respect to truck bed 10, as shown in FIG. 7. When internal frame 30 is raised such that second shelf 34 is close to or level with the top of truck bed 10, the user can easily access all stored items 18 located on second shelf 34. Second shelf 34 preferably extends the length of truck bed 52. It is in this manner that the full space of truck bed 10 can be utilized.

Figure 8:
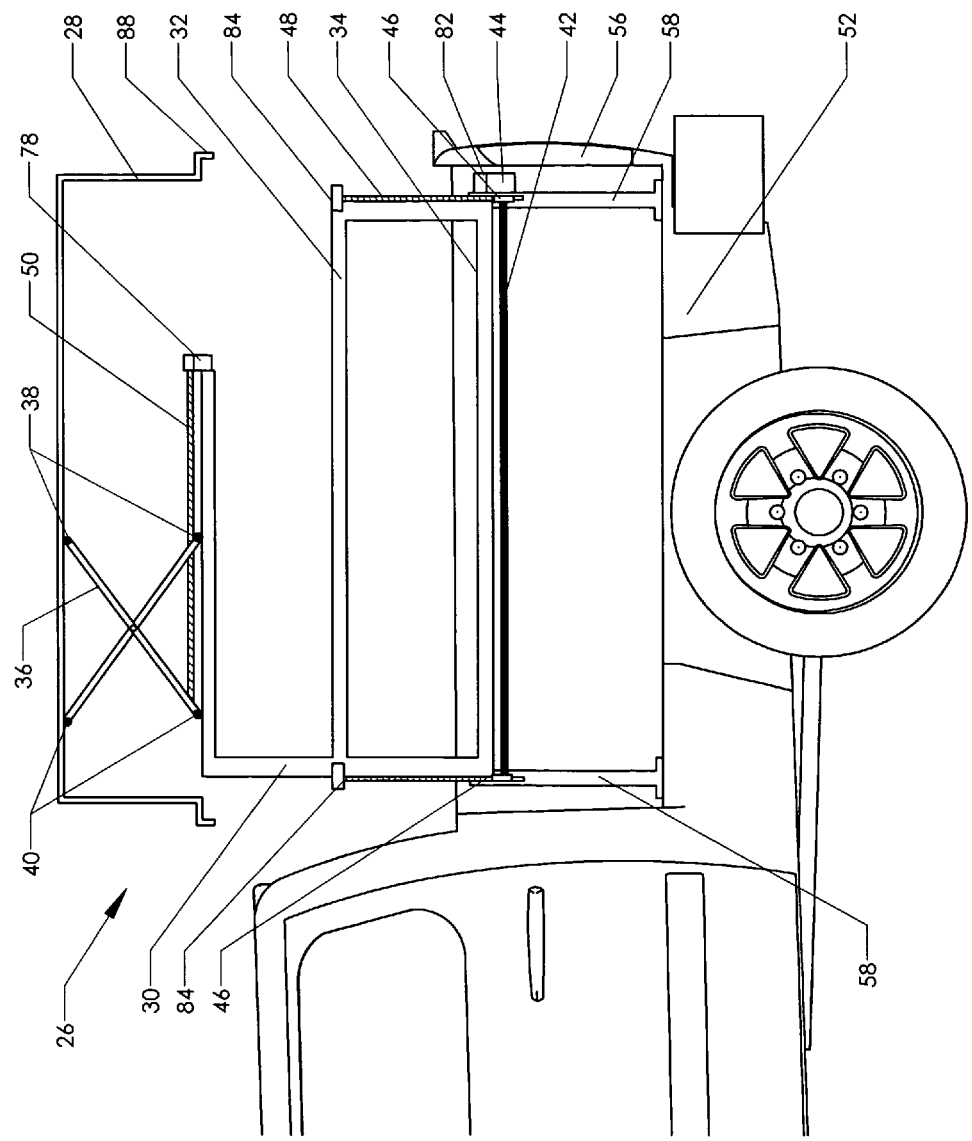
FIG. 8 is a section view, showing the present invention in a fully open and raised position.

A section view is shown in FIG. 8 to better illustrate the preferred method of operating the present truck bed cap 26. FIG. 8 shows the truck bed cap 26 in a fully expanded or open position, wherein second shelf 34 is approximately level with top of truck bed 52. In the preferred embodiment a series of commonly driven lifting posts 48 will be associated with each corner support 58. Each lifting post 48 is preferably a threaded lifting screw which when activated lowers and raises internal frame 30 thereby lowering and raising first shelf 32 and second shelf 34.

Figure 8A:
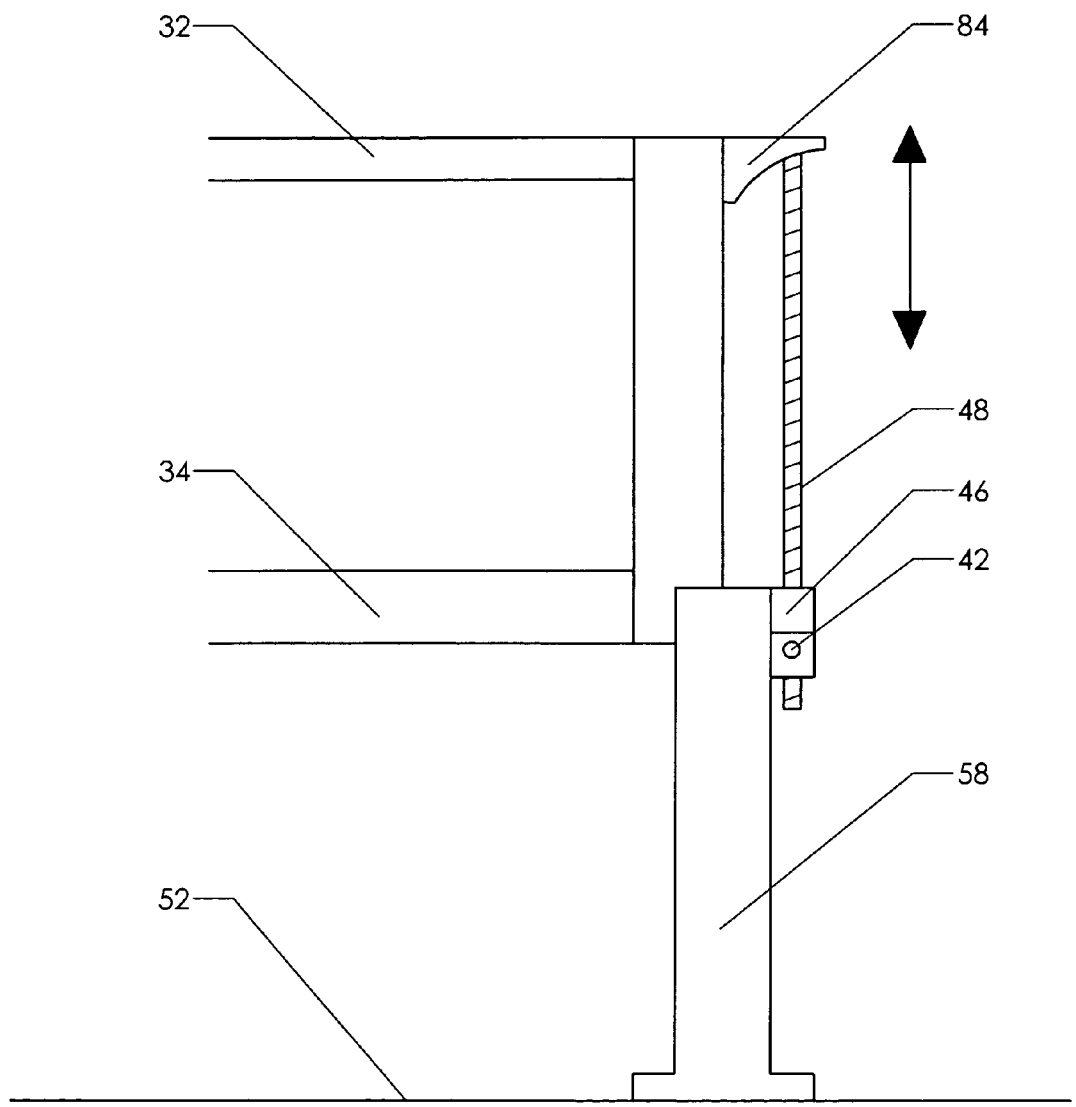
FIG. 8A is a section view, showing a view from the back of the present invention, wherein the shelves are in a raised position.
Figure 15:
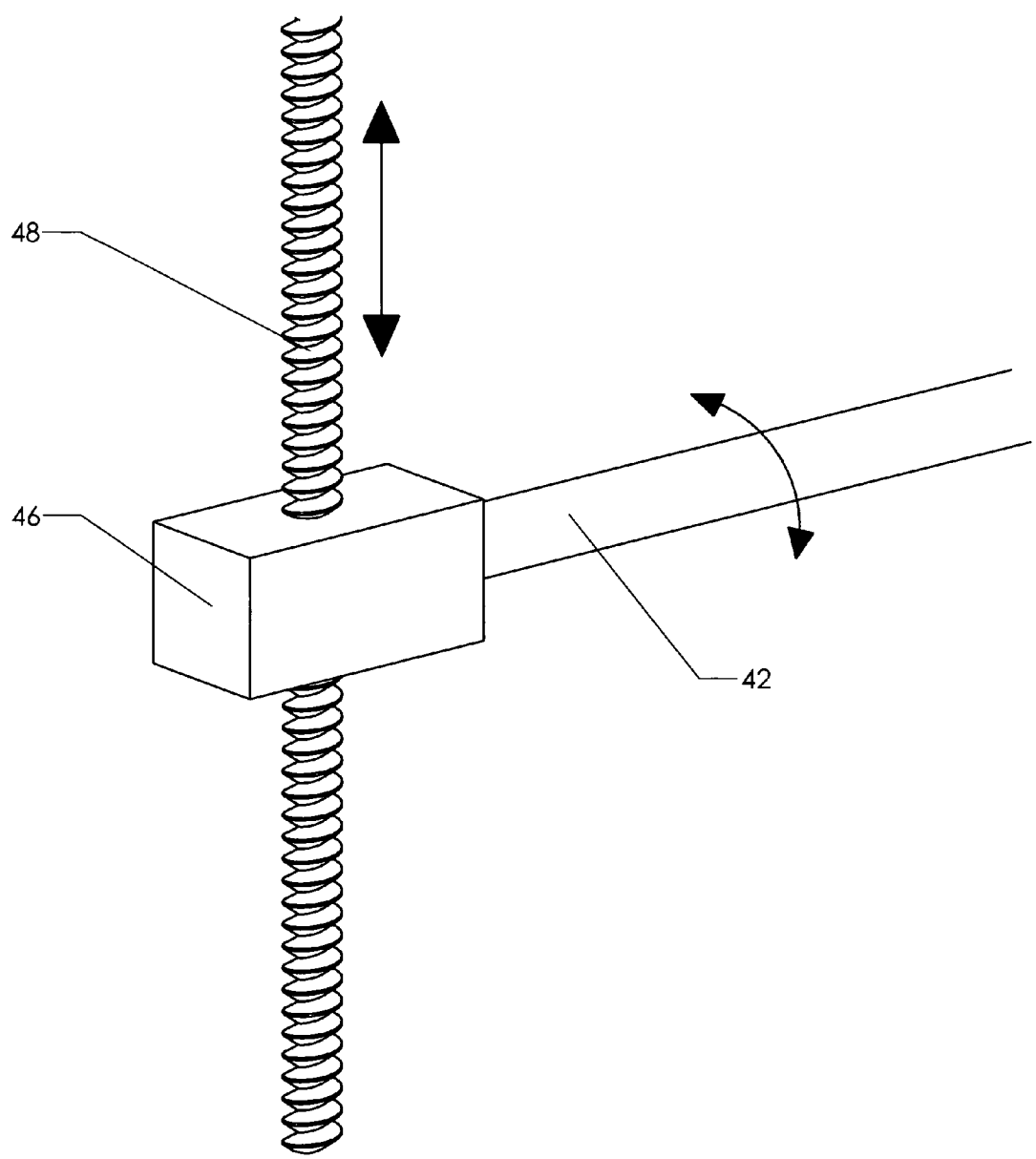
FIG. 15 is a perspective view, showing the manner of operation of the gear system of the present operation.

FIG. 8A, showing a section view from the back of the truck, better illustrates the mechanics of lifting post 48. First shelf 32 and second shelf 34 move up and down as one unit on corner post 58 as extension 84 moves up or down driving by the action of lifting post 48. Lifting post 48 is operated by a gear within gear box 46 and drive shaft 42. The specific mechanics of gears are not shown, as one knowledgeable in the art will understand the operation of gear boxes 46. In FIG. 15 the reader will observe that as drive shaft 42 rotates, lifting post 48 moves up or down through gear box 46, dependent on the direction of rotation of drive shaft 42.

Figure 9:
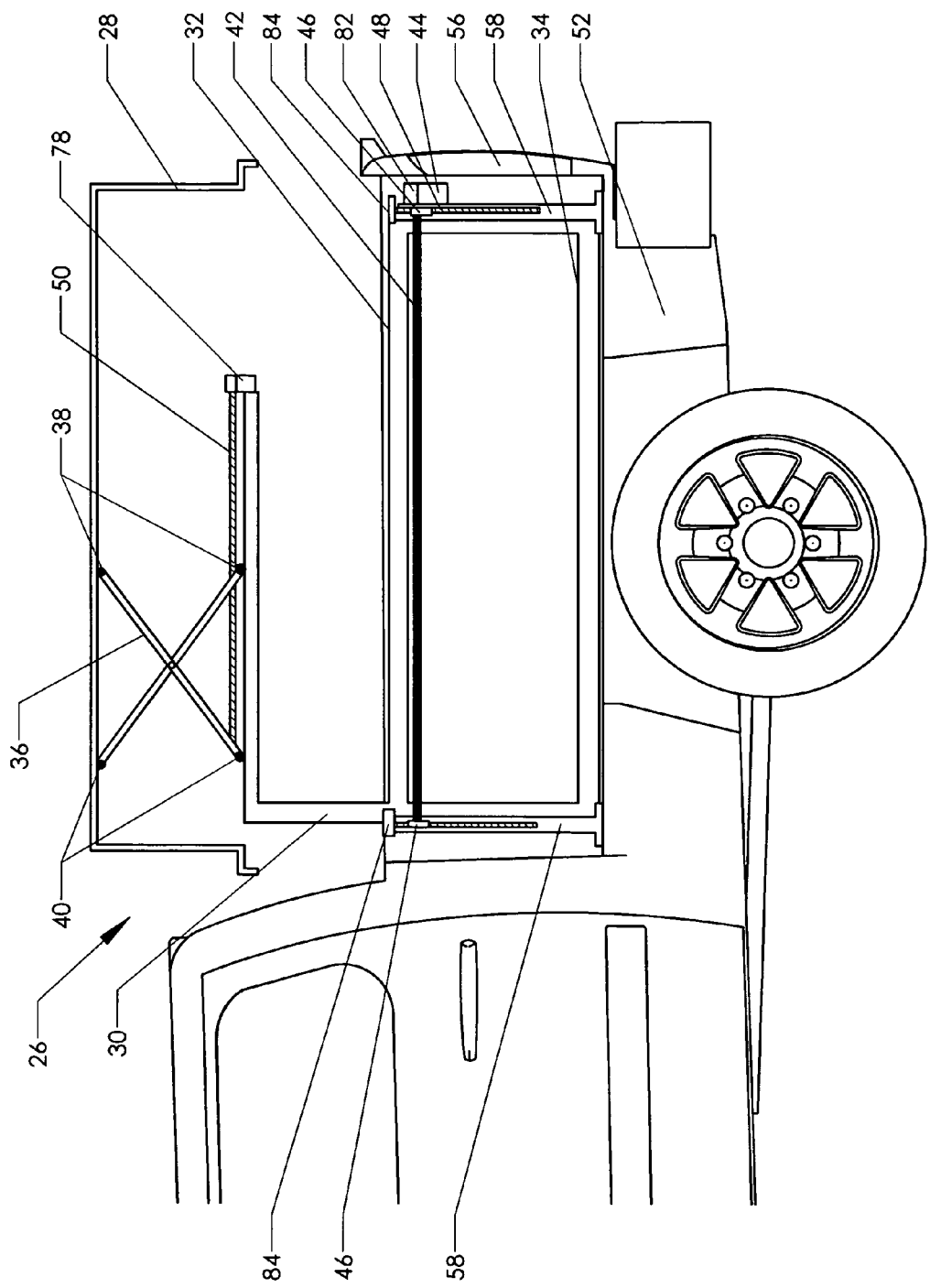
FIG. 9 is a section view, showing the present invention in a partially open position.

As illustrated in FIG. 9, second shelf 34 lowers to meet truck bed 52 when lifting posts 48 are lowered by gear system. In this view, first shelf 32 sits approximately at the same level as the top of truck bed 52. Thus, the user can easily access first shelf 32 in this position. Drive shaft 42 extends between gears 46 in corner supports 58.

Figure 9A:
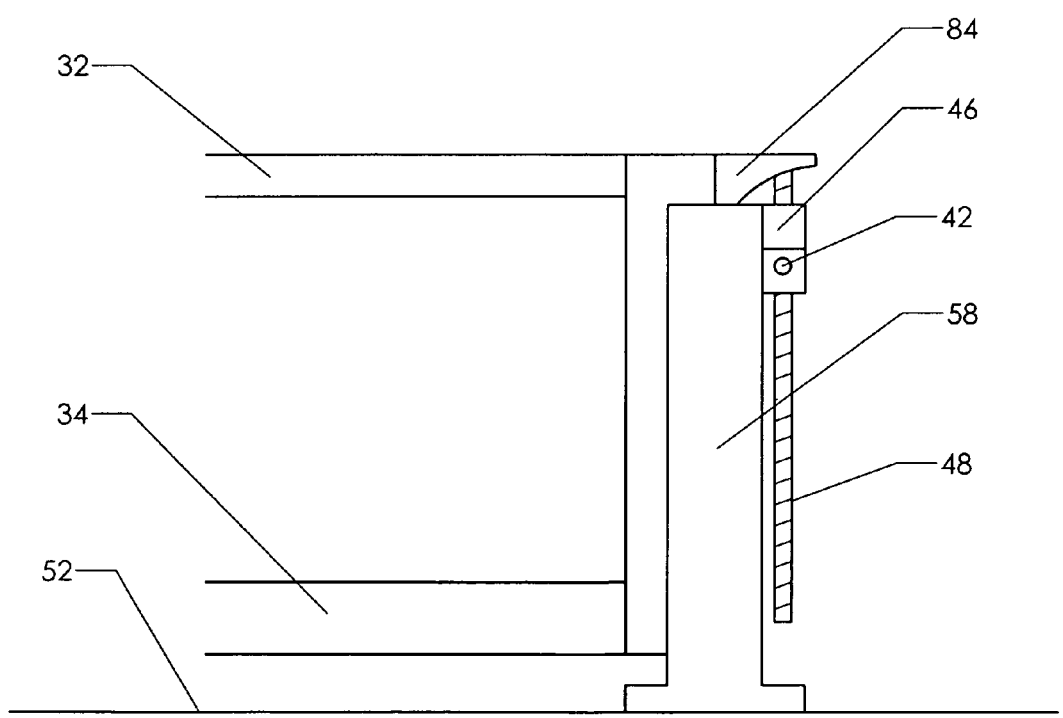
FIG. 9A is a section view, showing a view from the back of the present invention, wherein the shelves are in a lowered position.

FIG. 9A shows a section view from the back of the truck, where second shelf 34 is lowered to truck bed 52. Lifting post 48 has been threaded through gear box 46 bringing extension 84 and internal frame 30 to a lowered position.

Figure 10:
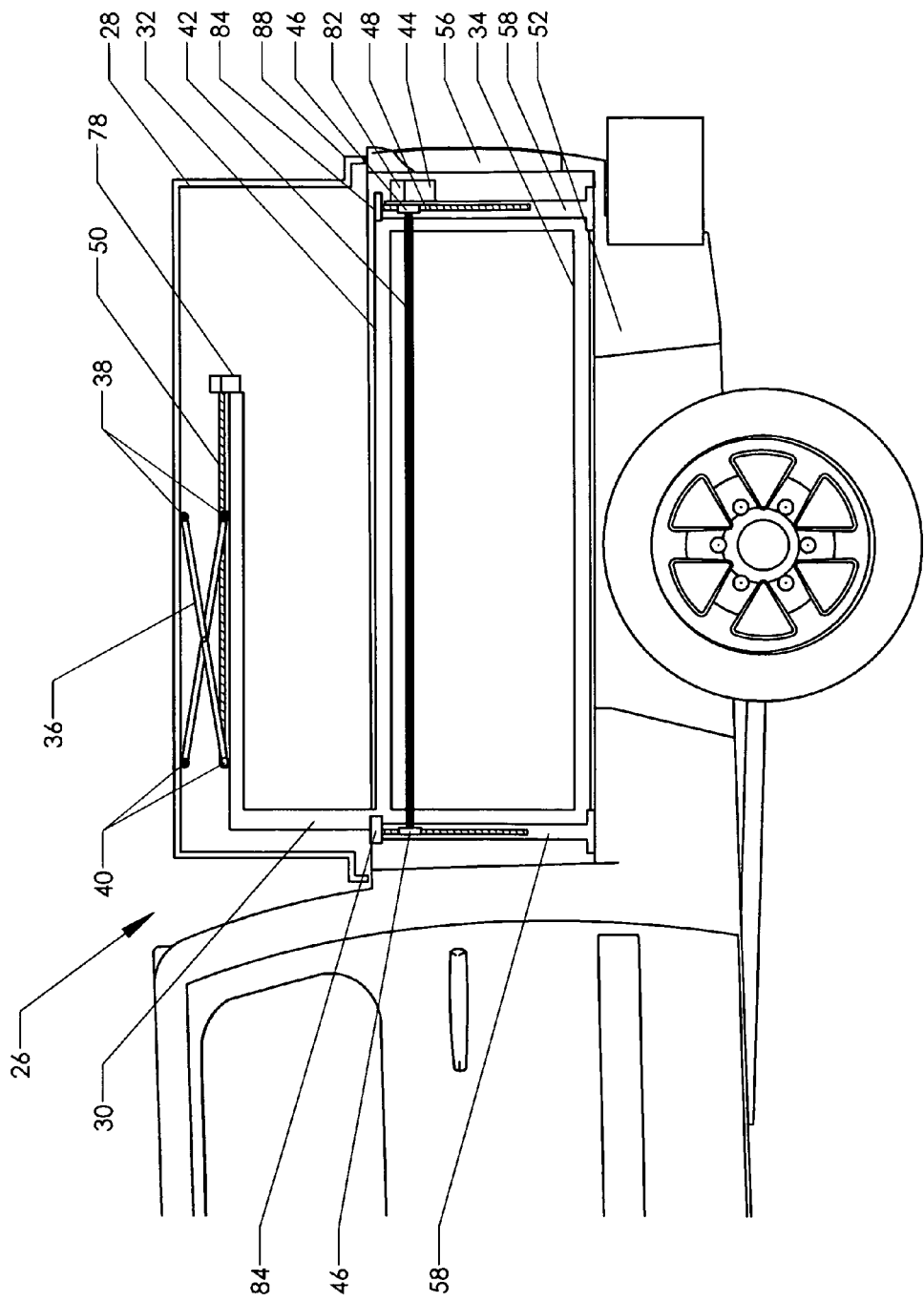
FIG. 10 is a section view, showing the present invention in a fully closed position.
Figure 10A:
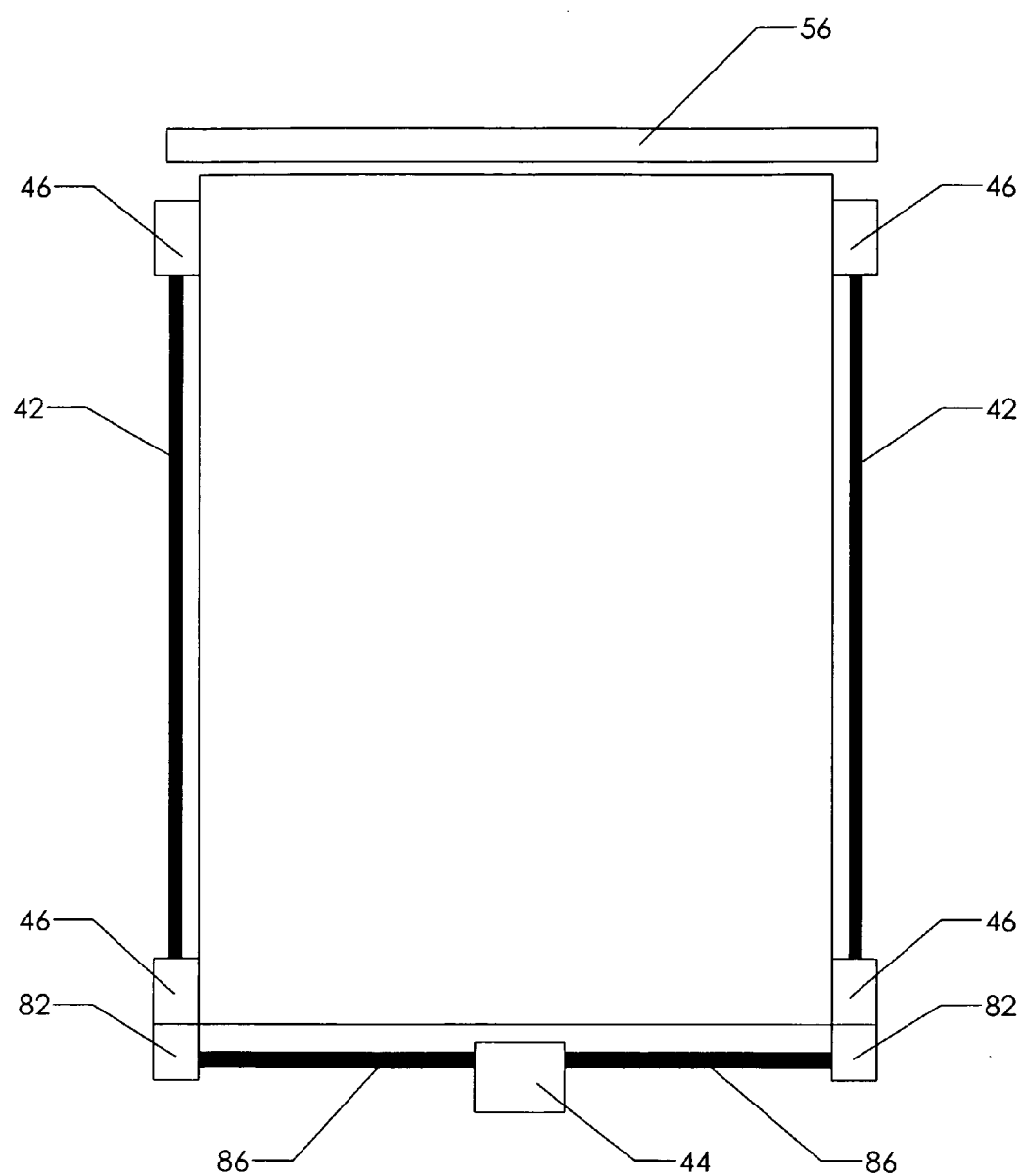
FIG. 10A is a plan view, showing the gear system from the top of the present invention.

The full gear system is illustrated in a plan view in FIG. 10A. Gear motor 44, located at the front or back of truck, activates input drive shafts 86 and drive shafts 42. Input 82 operates in conjunction with gear boxes 46 and as drive shafts 42 rotate, lifting posts (shown in FIGS. 8A, 9A and 15) are driven up or down. The user can activate gear motor 44 via a remote control.

Figure 12:
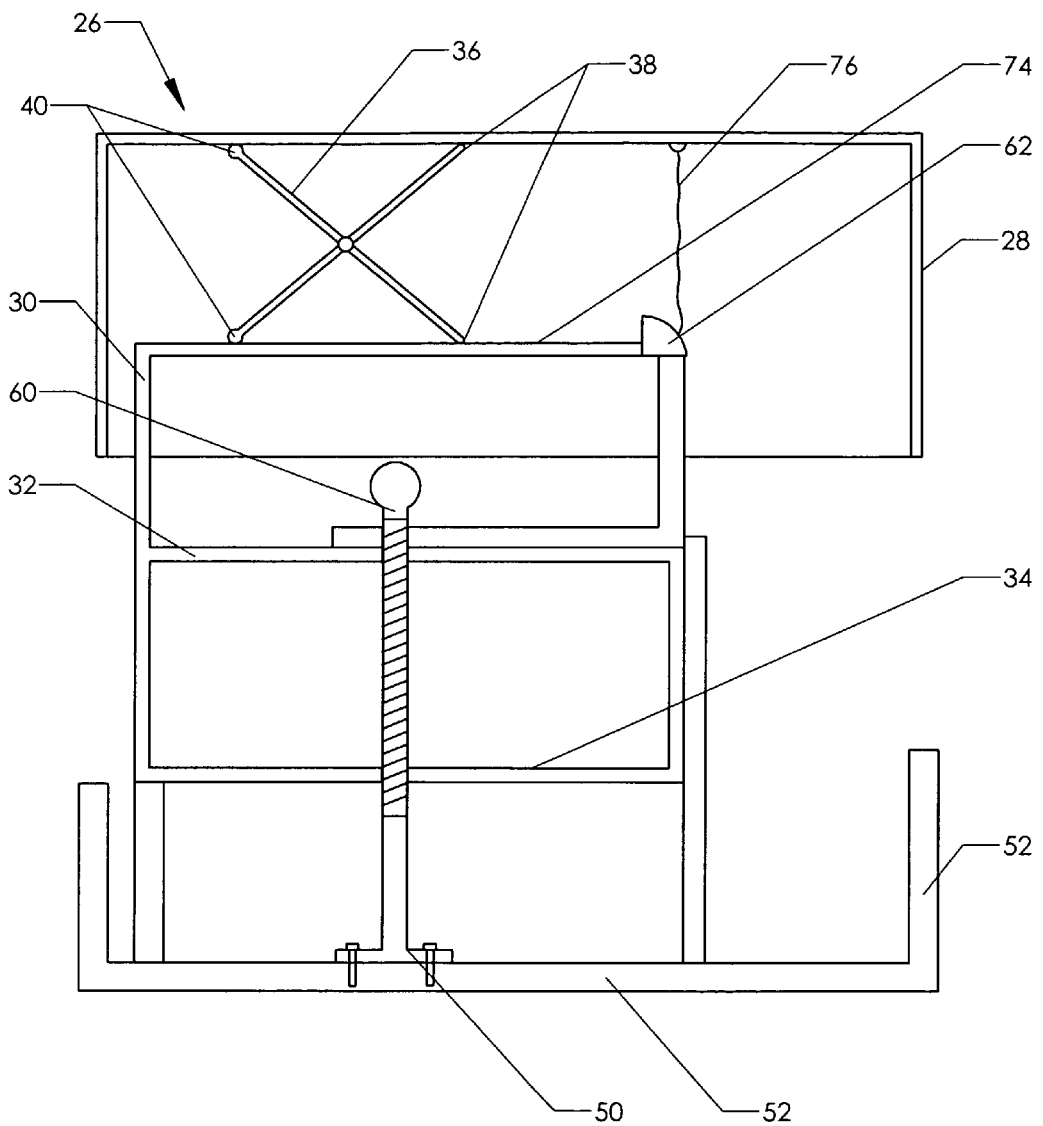
FIG. 12 is a section view, showing an alternate embodiment of the present invention.

While a gear motor 44 and lifting posts 48 are used in the present embodiment, one skilled in the art will recognize that any device that is able to shift internal frame 30 vertically with regard to truck bed 52 could be used. For example, an electric screw jack 60 could be placed in the center of internal frame 30 to move internal frame 30 with respect to truck bed 52 as shown in FIG. 12. Additionally, lifting posts 48 could be located within corner posts 58 such that the system is partially hidden.

Figure 11:
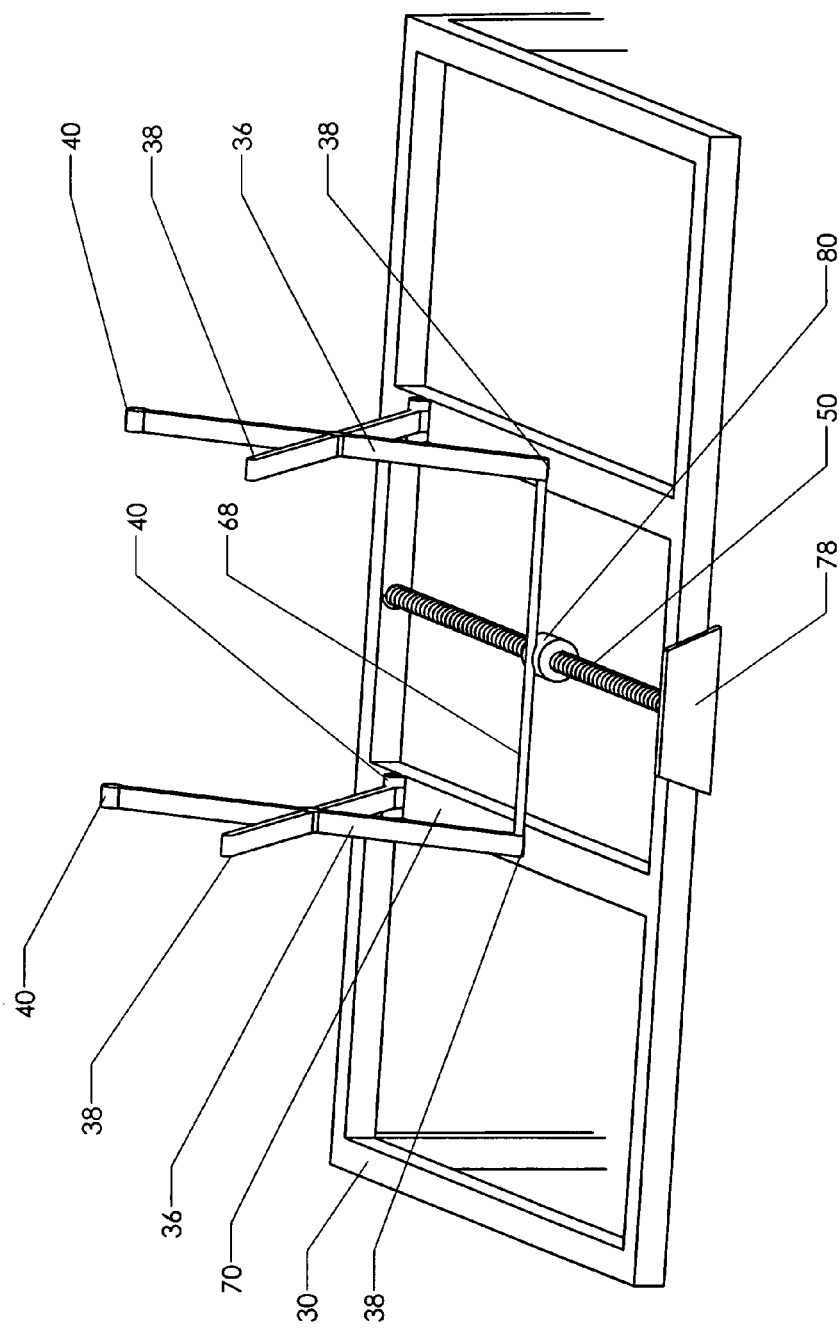
FIG. 11 is a perspective view, showing the top of internal frame and the present invention with the scissor lifts raised.

As illustrated in FIG. 11, top 28 is preferably raised and lower by a scissor lift comprised generally of two arm assemblies 36. Pivot pins 40 are securely attached to the top of internal frame 30 and top 28. Bearings 38 roll along internal frame 30 and top 28 as top gear motor 78 operates to pull arm assemblies 36 up and down. Top gear motor 78 is preferably a gear motor screw set up. A perspective view of scissor lift is shown in FIG. 11. In the preferred embodiment there are two arm assemblies 36 attached together by a solid bar 68. Bearings 38 roll along internal frame 30 at a groove. While top 28 is not shown in FIG. 11, the reader will note that a similar groove would allow bearings 38 on top of arm assemblies 36 to move along underside of top 28, preferably along an attached rail rather than into the top directly. As top gear motor 78 pulls and releases screw 50; bar 68 acts to move arm assemblies 36 up and down at the same time. As illustrated in FIG. 9, when scissor lift is fully raised top 28 sits well above first shelf 32 allowing access to first shelf 32 by user. When scissor lift is fully lowered top 28 rests nearly even with top of internal frame 30 and contacts the top of truck bed 52, as shown in FIG. 10. Top 28 could optionally contain lip 88 which creates added protection from water seeping into truck bed 52. Additionally, top gear motor 78 can contain a current sensing circuit which shuts down top gear motor 78 if an increased load is detected upon lowering the cap, for added safety (this feature is not described further as implementation of the feature is known in the prior art).

An alternate embodiment of the scissor lift system is shown in FIG. 12. In FIG. 12 winch 62 pulls winch cable 74 back and forth, raising and lowering the arm assemblies 36. If the arm assemblies 36 are pulled too high a safety line 76 will act to unplug winch 42, as shown.

Figure 13:
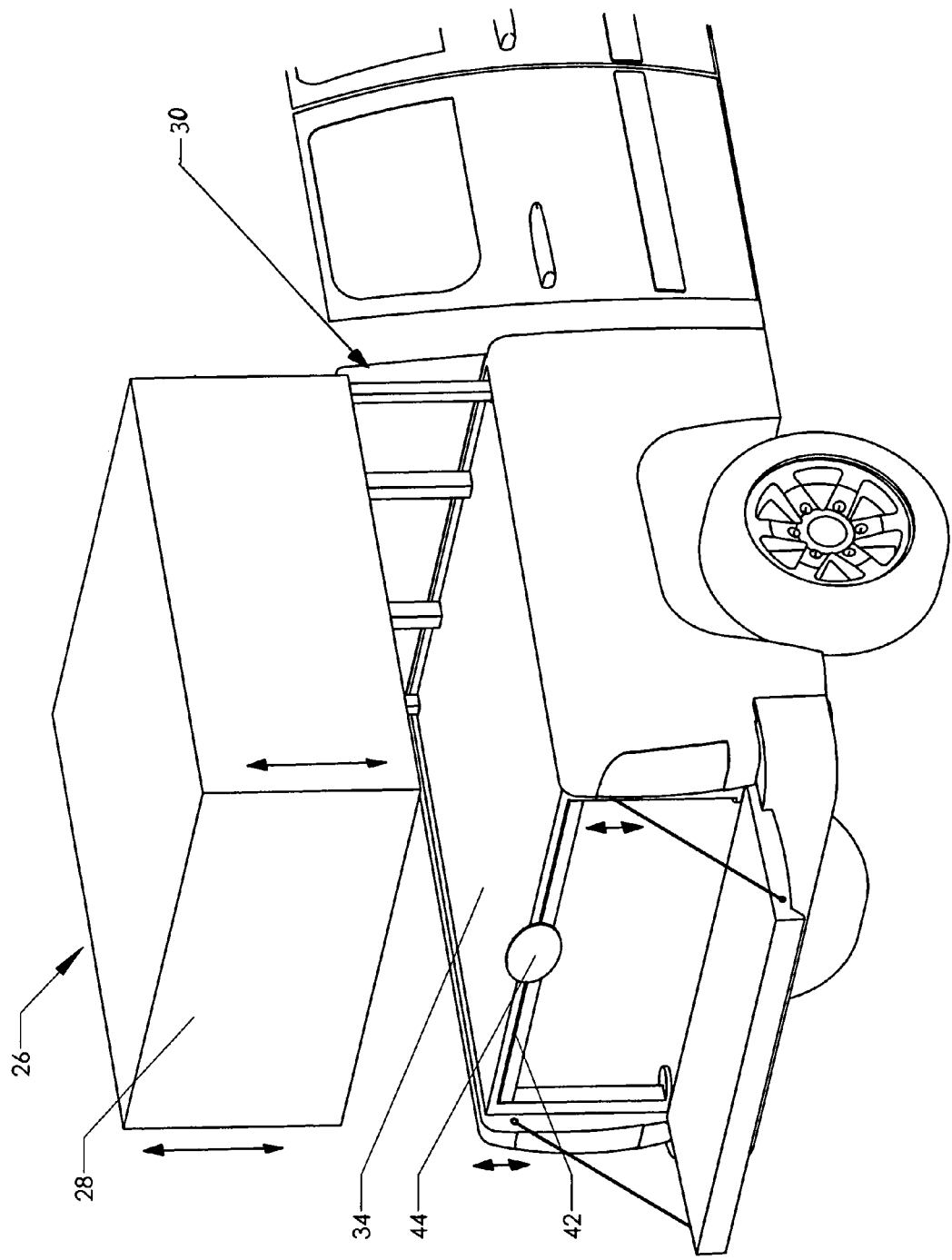
FIG. 13 is a perspective view, showing an alternate embodiment of the present invention with only one shelf.

Another alternate embodiment of the present truck cap 26 is shown in FIG. 13, wherein shelf 34 extends the full length of the truck bed 52. In this embodiment shelf 34 is to only shelf attached to internal frame 30 and is the only shelf within the present truck cap 26 structure.

The preceding description contains significant detail regarding the novel aspects of the present invention. It should not be construed, however, as limiting the scope of the invention but rather as providing illustrations of the preferred embodiments of the invention. As an example, scissor lift system could be replaced by an automatic hydraulic system for raising and lowering top 28. Additionally, an electric screw jack 48 could be used to raise and lower internal frame 30. Thus, the scope of the invention should be fixed by the following claims, rather than by the examples given.

The invention claimed is:

1. A truck bed cap for accessing items in the bed of a truck, said cap comprising:
   a. at least four corner posts attached to said bed of said truck;
   b. an internal frame engaged with said at least four corner posts;
   c. a first shelf fixed to said internal frame;
   d. a second shelf fixed to said internal frame below said first shelf;
   e. a top engaged with said internal frame;
   f. wherein said top shifts vertically with respect to said internal frame; and
   g. wherein said internal frame shifts vertically with respect to said at least four corner posts.

2. The cap of claim 1, wherein said top is connected to said internal frame by a scissor lift.

3. The cap of claim 2, wherein said scissor lift is comprised of:
   a. at least two arm assemblies;
   b. at least two pivot pins connecting said scissor lift to said top on a first side;
   c. at least two pivot pins connecting said scissor lift to said internal frame on a first side;
   d. at least two bearings engaging said scissor lift with said top on a second side;
   e. at least two bearings engaging said scissor lift with said internal frame on a second side; and
   f. a bar connecting said at least two arm assemblies together.

4. The cap of claim 3, wherein said scissor lift further comprises a gear motor screw set-up connected to said bar of said scissor lift, wherein said gear motor screw set-up is configured to raise and lower said arm assemblies.

5. The cap of claim 1, wherein said top is comprised of aluminum.

6. The cap of claim 1, wherein said top is comprised of molded plastic.

7. The cap of claim 1, further comprising a lock which connects said top to said bed of said truck.

8. The cap of claim 1, further comprising a storage unit attached to said first shelf.

9. The cap of claim 1, further comprising a storage unit removably attached to said first shelf.

10. The cap of claim 1, wherein when said top shifts vertically with respect to said internal frame exposing said first shelf, said first shelf is fully unobstructed on three sides of said truck.

11. The cap of claim 1, wherein said first shelf and said second shelf extend the length of said bed of said truck.

12. The cap of claim 1, wherein said first shelf extends two-thirds of the length of said bed of said truck and said second shelf extends the length of said bed of said truck.

13. The cap of claim 1, further comprising:
   a. at least four gear boxes attached to said at least four corner supports;
   b. at least four lifting posts, wherein said four lifting posts:
      i. attach to said internal frame on a first end; and
      ii. engage with said at least four gear boxes;
   c. at least two drive shafts, wherein said at least two drive shafts engage with said at least four gear boxes;
   d. a gear motor attached to said internal frame;
   e. at least two input drive shafts, wherein said at least two input drive shafts:
      i. engage with said gear motor on a first end; and
      ii. engage with at least two gear boxes on a second end;
   f. wherein said gear motor rotates said at least two input drive shafts;
   g. wherein when said at least two input drive shafts rotate said at least two drive shafts rotate;
   h. wherein when said at least two input drive shafts and said at least two drive shafts rotate, said at least four gear boxes activate said at least four lifting posts such that said at least four lifting posts move through said at least four gear boxes; and
   i. wherein when said at least four lifting posts move said internal frame shifts vertically with respect to said bed of said truck.

14. The cap of claim 13, wherein said gear motor is operated from a remote control.

* * * * *